United States Patent [19]

Lenhard-Backhaus et al.

[11] Patent Number: 5,062,718
[45] Date of Patent: Nov. 5, 1991

[54] ONE-HALF PART OF A SLIDING SURFACE BEARING

[75] Inventors: Hugo Lenhard-Backhaus; Otto Ehrentraut, both of Gmunden; Ottmar Haager, Laakirchen, all of Austria

[73] Assignee: Miba Gleitlager Aktiengesellschaft, Laakrichen, Austria

[21] Appl. No.: 345,706

[22] PCT Filed: Jul. 6, 1988

[86] PCT No.: PCT/AT88/00050
§ 371 Date: Mar. 3, 1989
§ 102(e) Date: Mar. 3, 1989

[87] PCT Pub. No.: WO89/00250
PCT Pub. Date: Jan. 12, 1989

[30] Foreign Application Priority Data

Jul. 6, 1987 [AT] Austria ................................ 1689/87

[51] Int. Cl.⁵ ........................ F16C 33/06; F16C 17/10
[52] U.S. Cl. .................................. 384/294; 384/275; 384/296
[58] Field of Search ............... 384/275, 276, 288, 294, 384/295, 296, 424, 429, 273, 282

[56] References Cited

U.S. PATENT DOCUMENTS 4,652,150  3/1987  New ................................. 384/275
4,924,523  5/1990  Gojon ........................... 384/275 X

FOREIGN PATENT DOCUMENTS 317618   12/1973  Austria .
192592    8/1986  European Pat. Off. .
2604255   8/1976  Fed. Rep. of Germany .
3730165   3/1989  Fed. Rep. of Germany ...... 384/296
1386253   3/1975  United Kingdom .
2134189   8/1984  United Kingdom .
2225392   5/1990  United Kingdom ................ 384/282

Primary Examiner—Thomas R. Hannon
Attorney, Agent, or Firm—Collard, Roe & Galgano

[57] ABSTRACT

In a one-half part of a sliding surface bearing comprising a bearing half-shell (1) and at least one stop collar (2), the stop collar (2) constitutes a separate end flange and has mounting extensions (5), which protrude toward the bearing half-shell (1) and extends into fitting openings (3) of the bearing half-shell (1), which openings are open at the end face.

To permit relatively large radii at the transition between the bearing half-shells (1) and the stop collar (2), the fitting openings (3) have an undercut (4), which is effective in an axial direction, and the mounting extensions (3) of the stop collar (2) extend behind the undercuts (4) and are axially aligned.

4 Claims, 2 Drawing Sheets

ONE-HALF PART OF A SLIDING SURFACE BEARING

This invention relates to a half part of a sliding surface bearing consisting of a bearing half-shell and at least one stop collar, which is constituted by a separate end flange and has mounting lugs which protrude toward the bearing half-shell and extend into open-ended fitting openings in the end faces of the bearing half-shell In half parts of sliding surface bearings, a stop collar which is separate from the bearing half-shell may be provided substantially for two reasons: the manufacture is simpler and the adaptation is improved because the possible deformation suffered by the bearing half-shell as it is inserted into a bearing base bore will not be hindered by the stop collar and because constraining forces caused by relative movements between the bearing half-shell and the stop collar will be avoided. In order to provide a prefabricated unit of construction which can easily be handled although the stop collar and the bearing half-shell have separately been manufactured, it is known (Austrian Patent Specification 317,618) to provide the bearing half-shell at its end faces with open-ended fitting openings, which receive radially inwardly extending mounting lugs of the stop collar. The end flange which constitutes the stop collar is axially pushed onto the bearing half-shell in such a manner that the mounting lugs are inserted into the fitting openings of the bearing half-shell. To lock the stop collar against being axially pulled off subsequently, spreading stops are subsequently bent to extend axially in front of the mounting lugs, which are disposed in the fitting openings. A main disadvantage of that known design resides in that the possible radius at the transition between the bearing half-shell and the stop collar is restricted by the radially inwardly extending mounting lugs, which are embraced by the spreading extensions of the bearing half-shell, and for this reason sliding surface bearings composed of said bearing half-shells cannot be used with shafts having relatively large transition radii adjacent to a shaft collar. Besides, the axial fixation of the stop collar relative to the bearing half-shell only by the inturned spreading stops is not always sufficient.

To permit a connection of the stop collar to the bearing half-shell without the aid of a tool it is finally known (German Patent Specification 2,604,255 ) to insert the stop collar into a peripheral groove adjacent to the forward end of the bearing half-shell and to provide the stop collar with radially inwardly directed lugs, which enter corresponding openings of the bearing half-shell, so that the stop collar is axially and radially located relative to the bearing half-shell. The insertion of the radially inwardly directed lugs of the stop collar into the associated openings of the bearing half-shell may be facilitated by the elastic deformability thereof in that the axial edge portions of the bearing half-shell are forced toward each other as the stop collar is inserted into the peripheral groove so that the axial edge portions of the bearing half-shell will then move past the inwardly directed stops of the stop collar until said lugs are disposed adjacent to the openings of the shell in the mounted position and the elastic restoring of the bearing half-shell causes the lugs of the stop collar to snap into the bearing recess. That known design has the disadvantage that the bearing half-shell is weakened by the peripheral groove and the radius at the transition between the bearing half-shell and the stop collar is restricted owing to the design so that the field of application of such bearing half-shells is greatly restricted.

For this reason it is an object of the invention to avoid said disadvantages and so to improve with a simple means a half part of a sliding surface bearing which is of the kind described hereinbefore that an adequate transmission of force between the stop collar and the bearing half-shell is still ensured and the radius at the transition between the bearing half-shell and the stop collar may be made much larger than in conventional half parts of bearings of that kind.

The object set forth is accomplished in accordance with the invention in that the fitting openings have an undercut, which is effective in an axial direction and the mounting lugs of the stop collar extend behind the undercuts and are axially aligned.

Because fitting openings having an axially acting undercut are provided as well as also axially extending mounting lugs, which extend behind that undercut, it is ensured that the bearing half-shell and the stop collar will be connected by an axially effective joint, which is capable of transmitting even relatively strong forces and is independent of the wall thickness of the bearing half-shell and the stop collar. This is due to the fact that the undercuts and the mounting lugs can be designed in dependence on the loads to be taken up. The radial pulling of the stop collar from the bearing half-shell is achieved because the mounting lugs extending into the fitting openings are angularly offset. When one of the mounting lugs can be radially pulled from the associated fitting opening, the other mounting lugs will block such a possible movement because they will bear on the boundary of the fitting openings. Besides, the axial alignment of the undercut fitting openings and of the mounting lugs which extend into said openings permit the radius at the transition between the bearing half-shell and the stop collar to be substantially freely selected because the joint between the stop collar and the bearing half-shell does not depend on radially inwardly directed mounting lugs disposed in the plane of the flange.

Whereas there is no restriction regarding the shape of the undercut of the fitting openings, provided that an adequate transmission of force can be ensured, particularly good conditions for the transmission of force will be provided if the fitting openings and the equal and opposite mounting lugs are dovetail-shaped because comparatively large force-transmitting surfaces can be ensured in such case.

In accordance with a further feature of the invention the mounting lugs may consist of tongues, which are angled to extend in an axial direction and which may have any desired length so that they will meet in a given case the requirements for the joint in consideration of a predetermined radius at the transition between the bearing half-shell and the stop collar.

Because the fitting openings are undercut, the stop collars cannot be axially slidably fitted on the bearing half-shell if the mounting lugs conform to the undercut. For this reason the stop collar is preferably fitted onto the bearing half-shell in a plane which is normal to the axis and the insertion of the mounting lugs into the fitting openings, which do not extend in the direction in which the stop collar is slidably fitted, is facilitated in that the elastically deformable bearing half-shell is compressed or expanded so that the bearing half-shell can be moved past said mounting lugs until they are disposed adjacent to the associated fitting openings. For a disassembly, it will be sufficient to move the mounting lugs out of their fitting openings by a relatively slight elastic deformation of the bearing half-shell so that the stop collar can be lifted from the bearing half-shell in a reverse sequence.

If the bearing half-shell has a relatively high bending strength so that it does not permit such a resilient insertion of the mounting into the fitting openings, a simple assembling can be ensured in that at least one of the mounting lugs has an at least approximately right-angled basic shape and has edge webs, which can be deflected in accordance with the undercut of the associated fitting opening. Such a mounting lug can then be inserted into the associated undercut fitting opening also in an axial direction as will be required when the stop collar for its mounting is pivotally moved relative to the bearing half-shell about a diameter or a tangent of the latter. Such a pivotal movement will permit at least those mounting extensions which are disposed close to the pivotal axis to be inserted with a permissible play into said fitting openings although said lugs have a wider portion which extends behind the undercut of the associated fitting openings and this will not adversely affect the axial retention of the stop collar when the edge webs of the basically right-angled mounting lug have been deflected.

BRIEF DESCRIPTION OF THE DRAWINGS

The subject matter of the invention is shown by way of example on the drawing, in which.

Figure 1:
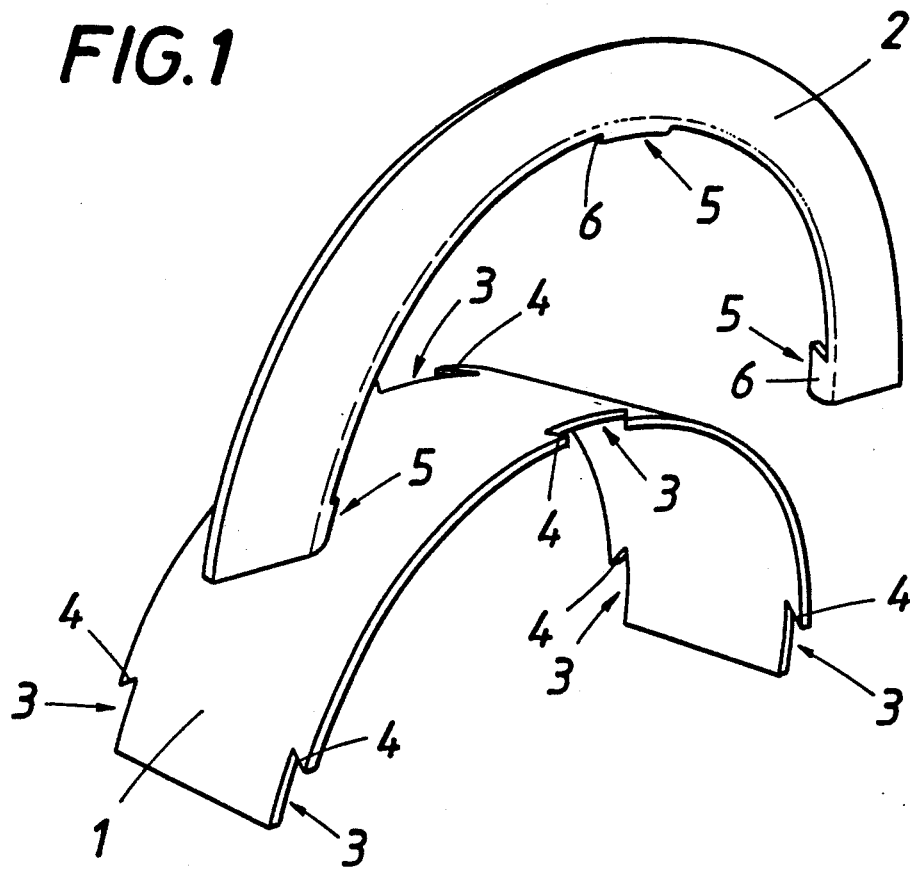
FIG. 1 is a simplified perspective view showing a half part of a sliding surface bearing in accordance with the invention before the stop collar has been joined to the bearing half-shell.
Figure 2:
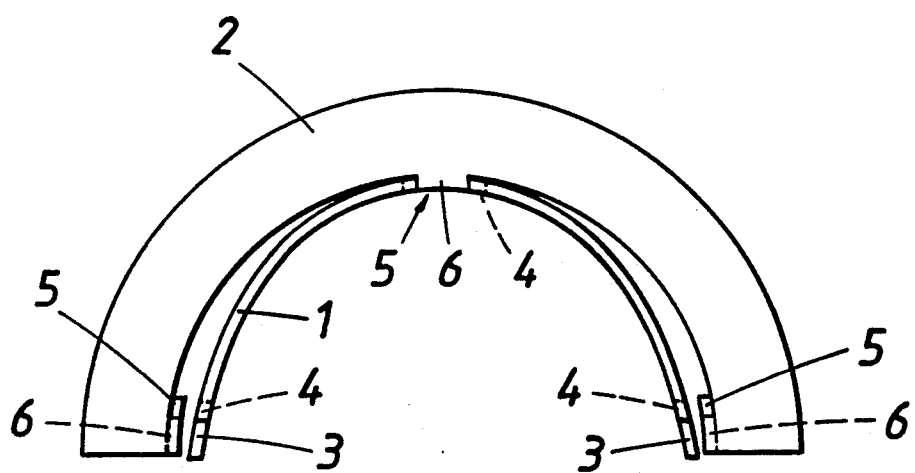
FIG. 2 is an end elevation showing that half part of the sliding surface bearing during the insertion of the mounting lugs of the stop collar into the associated fitting openings.

As is apparent from FIGS. 1 and 2, the illustrated half part of the sliding surface bearing consists of a bearing half-shell 1 and a stop collar 2, which is constituted by an end flange. The shell 1 and the stop collar 2 are each provided with a properly disigned sliding surface, which is perferably galvanically applied although that has not been shown for the sake of clearness. To permit the stop collar 2 to be mounted on the bearing half-shell 1, the latter has fitting openings 3, which form a dovetail-shaped undercut 4, extending in an axial direction. The stop collar 2 is provided with mounting lugs 5, which correspond to said fitting openings 3 and which consists of tongues 6, which are angled to extend in an axial direction. To join the stop collar 2 to the bearing half-shell 1, the stop collar 2 is axially fitted onto the bearing half-shell 1 and the two axial edge portions of the bearing half-shells 1 are forced against each other at the same time, as is indicated in FIG. 2. As a result the bearing half-shell 1 can simply be moved past the outer tonguse 6 until said tongues 6 are disposed adjacent to the fitting openings 3 and the retaining interengagement is effected as the bearing half-shell 1 is elastically restored. The intermediate mounting lug 5 can directly be inserted in a radial direction into the associated fitting opening 3 because the direction of insertion agrees with the direction in which the stop collar 2 is fitted on the bearing half-shell 1.

Figure 3:
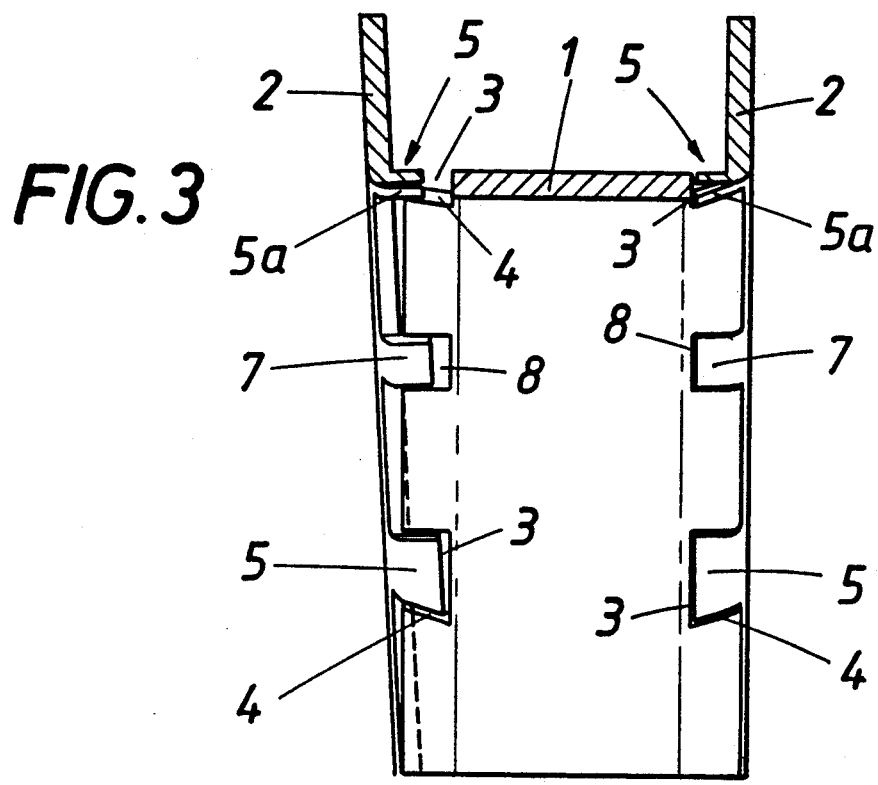
FIG. 3 is an axial sectional view illustrating a modified design of the half part of the sliding surface bearing in accordance with the invention and FIG. 4 is a perspective view showing the half part of the sliding surface bearing of FIG. 3 on a smaller scale.
Figure 4:
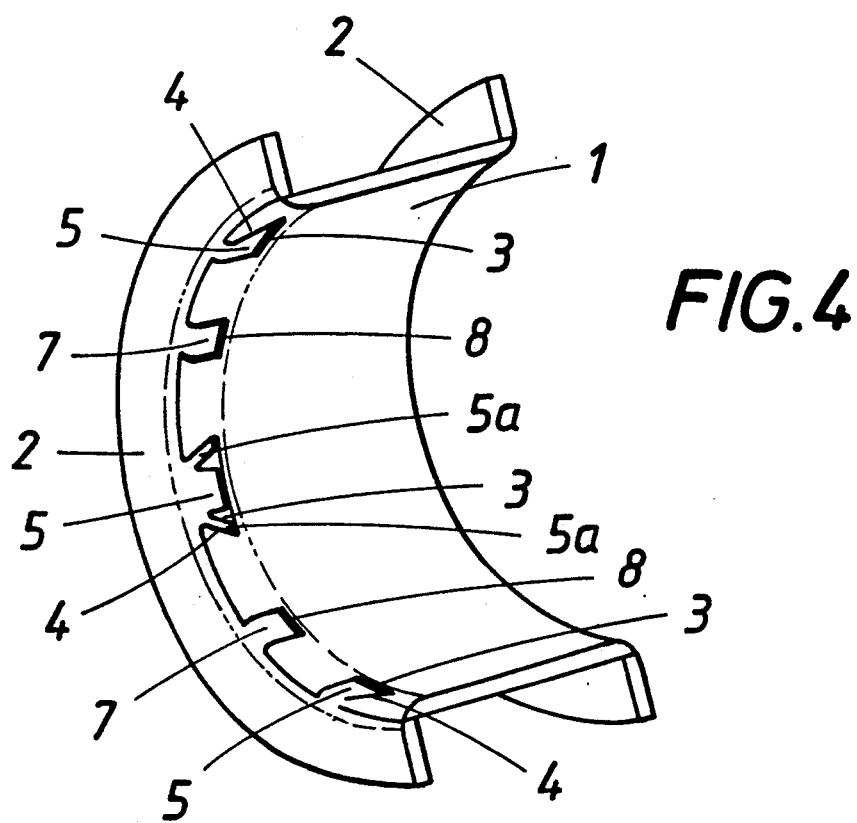

The bearing half-shell 1 shown in FIGS. 3 and 4 differs from the embodiment shown in FIGS. 1 and 2 by having a higher flexural stiffness so that the insertion of the mounting webs 5 can no longer be ensured by an elastic deformation of the bearing half-shell. For this reason the intermediate mounting lug 5 has an at least approximately right-angled basic shape and has two edge lugs 5a. When the intermediate mounting extension 5 has been substantially axially inserted into the associated fitting opening 3, the edge webs 5a can be laterally deflected to conform to the undercut 4 of the fitting opening 3 so that mounting mounting lug assumes a dovetail-shaped contour corresponding to the shape of the fitting opening 3, as is particularly apparent from FIG. 4.

Owing to that design the stop collar 2 can be mounted on the bearing half-shell 1 by pivotally moved the stop collar 2 toward the bearing half-shell about a diameter which connects the two axial edges of the bearing half-shell 1 adjacent to its end, as is indicated in FIG. 3 for the left-hand stop collar 2. Owing to the existing play, the two mounting lugs 5 provided near the edges can be inserted into the associated fitting openings 3 during such pivotal movement and this will not endanger the axial retention of the stop collar which is ensured by the undercut 4 because when the edge webs 5a in the intermediate fitting opening 3 have been deflected the stop collar 2 can no longer be pivotally moved in a sense to move the mounting lugs 5 near the edges out of the fitting openings 3. For an additional retention of the stop collars 2 relative to the bearing half-shell 1 the stop collars 2 may be provided between the mounting lug 5 with stops 7, which extend into corresponding recesses 8 in the bearing half-shell 1 in order to ensure an adequate transmission of force also in the peripheral direction. When the edge webs 5a have been deflected, the stop collar 2 is retained relative to the shell 1 as is shown in FIG. 4 and as is also apparent from the showing of the right-hand stop collar in FIG. 3.

Because the mounting lugs 5 extend in an axial direction relative to the bearing half-shell 1 and do not extend in the plane of the flange, as is conventional, a reliable joint between the bearing half-shell 1 and the stop collars 2 will be achieved independently of the respective wall thickness and it will be possible to select virtually any desired radius for the transition between the bearing half-shell 1 and the stop collar 2.

What is claimed is:

1. A half part of a substantially semi-cylindrical sliding surface bearing having an axis, the bearing consisting of a bearing half-shell having end faces extending transversely to the axis and at least one stop collar constituted by a separate end flange, the end faces of the bearing half-shell defining undercut and open-ended fitting openings extending in an axial direction and the stop collar having axially aligned mounting lugs protruding toward the bearing half-shell and extending into the openings and behind the undercuts thereof.

2. The half part of a substantially semi-cylindrical sliding surface bearing according to claim 1, wherein the fitting openings and the mounting lugs are dovetailed, the openings and the lugs being equal and opposite.

3. The half part of a substantially semi-cylindrical sliding surface bearing according to claim 1, wherein the mounting lugs are tongues angled in the axial direction.

4. A half part of a substantially semi-cylindrical sliding surface bearing having an axis, the bearing consisting of a bearing half-shell having end faces extending transversely to the axis and at least one stop collar constituted by a separate end flange, the end faces of the bearing half-shell defining undercut and open-ended fitting openings extending in an axial direction and the stop collar having axially aligned mounting lug protruding toward the bearing half-shell and extending into the openings and behind he undercuts thereof, at least one of the mounting lugs has an at least approximately right-angled basic shape and has edge webs which are deflectable in accordance with the undercut of a respective one of the openings into which the mounting lug extends.

* * * * *